United States Patent [19]

Fomichev et al.

[11] 4,273,508
[45] Jun. 16, 1981

[54] METHOD FOR AUTOMATIC CONTROL OF POWER PLANT AND POWER PLANT OF COMPRESSOR STATION OF GAS PIPELINE SYSTEM, WHEREIN SAID METHOD IS EFFECTED

[76] Inventors: Mikhail M. Fomichev, ulitsa, Kirova, 20, kv. 1, Krasnodar; Mikhail B. Schepakin, Lefortovsky val, 7/6, Moscow; Anatoly G. Gudz, ulitsa Gertsenoa, 37, kv. 71, Moscow; Viktor G. Evdokimov, ulitsa B. Bronnaya, 5, kv. 26, Moscow; Nikolai E. Lukianov, Teply stan, mikroraion 8a, korpus 7a, kv. 95, Moscow; Irina A. Romanchenko, ulitsa Tramvainaya, 4, kv. 34; Andrei F. Salnikov, ulitsa Blagoeva, 7, kv. 72, both of Krasnodar, all of U.S.S.R.

[21] Appl. No.: 969,265

[22] Filed: Dec. 14, 1978

[51] Int. Cl.³ .................. F01D 17/04; F01D 17/08
[52] U.S. Cl. ......................... 415/1; 415/17; 415/28; 60/39.28 R
[58] Field of Search ............... 60/39.03, 39.46 G, 648, 60/677; 415/1, 28, 49, 17; 290/40 C

[56] References Cited

U.S. PATENT DOCUMENTS

| 1,669,522 | 5/1928 | Ihnes | 290/40 C |
| 1,709,689 | 4/1929 | Staege | 290/40 C |
| 1,726,730 | 9/1929 | Backstrom et al. | 60/648 |
| 1,915,983 | 6/1933 | Doran | 60/677 |

*Primary Examiner*—Louis J. Casaregola
*Attorney, Agent, or Firm*—Haseltine and Lake

[57] ABSTRACT

The proposed method for automatic control of a power plant is as follows. A control signal of the electric generator's electric load is applied to a first control element which controls the flow of gas supplied from the gas line to the high-pressure section of an expansion engine. This controls the amount of gas directed from the take-off chamber of the expansion engine to the gas pipeline. A control signal to control the pressure downstream of the expansion engine is applied to a second control element to control the flow rate of the gas flow directed from the low-pressure section of the expansion engine to the controlled counter-pressure line. A control signal to control the pressure downstream of the expansion engine is applied to a third control element to control the gas flow rate, which is installed in the line that bypasses the low-pressure section of the expansion engine, whereby the rest of the gas flow is directed to the controlled counterpressure line. The proposed power plant of a compressor station of a gas pipeline system with gas mains and gas pumping units including gas compressors and combustion chambers of gas turbine installations, wherein the proposed method is realized, comprises an electric generator intended to meet the power requirements of the compressor station and an expansion engine having a high-pressure section, a pressure chamber and a low-pressure section. The shaft of the expansion engine is coupled to that of said electric generator. The first control element is installed at the inlet of the high-pressure section of said expansion engine. A check valve is installed at the outlet of the take-off chamber of said expansion engine. The second control element is installed at the inlet of the low-pressure section of said expansion engine. In the line that bypasses the low-pressure section of said expansion engine there is installed the third control element. The power plant further includes a cooler of gas discharged from said take-off chamber of said expansion engine. The inlet of the high-pressure section of said expansion engine is connected through a heater and the first control element to the gas main; the outlet of the take-off chamber is connected through the check valve to another portion of the gas line; the outlet of the low-pressure section is connected to the combustion chambers.

1 Claim, 1 Drawing Figure

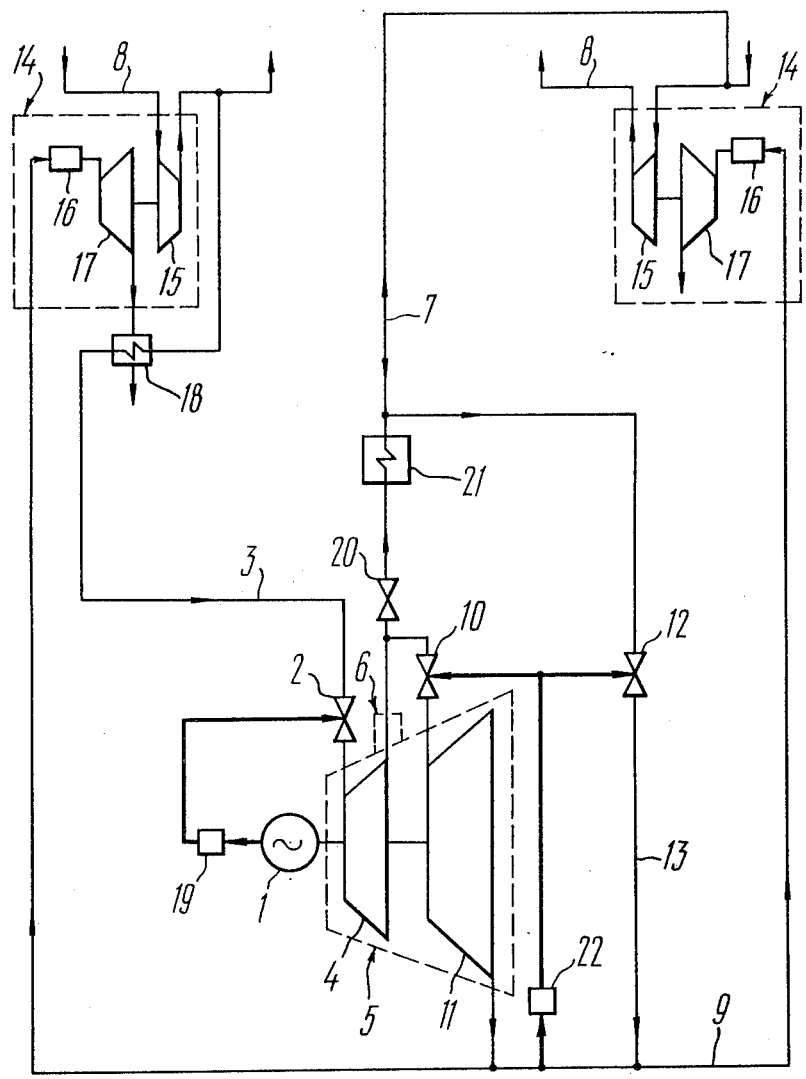

METHOD FOR AUTOMATIC CONTROL OF POWER PLANT AND POWER PLANT OF COMPRESSOR STATION OF GAS PIPELINE SYSTEM, WHEREIN SAID METHOD IS EFFECTED

The present invention relates to heat-power engineering and, more particularly, to a method for automatic control of a power plant and to a power plant of a compressor station of a gas pipeline system, in which said method is effected. The invention is applicable to power supply systems of gas compressor stations operating under variable conditions.

BACKGROUND OF THE INVENTION

There is widely known a method of controlling a power plant (a steam turbine) with a controlled bleed and counterpressure. According to this method, electrical energy is produced by a gas flow one part of which is partially discharged from the controlled bleed chamber, whereas the other part is directed from the power plant to the controlled counterpressure header. According to the method under review, a control signal to control the pressure downstream of the power plant (in the controlled counterpressure header) is applied to a control element which controls the flow rate of gas supplied to the high-pressure section of the power plant. The signal to control the pressure in the controlled bleed chamber is also applied to said control element for controlling the flow rate of gas directed to the high-pressure section of the power plant.

The control signal to control the pressure downstream of the power plant is also applied to another control element to control the flow rate of gas directed to the low-pressure section of the power plant. The control signal of the electric load of the electric generator, i.e. a pulse carrying information on the rotation speed of the power plant's rotor, is applied to the control element which controls the flow rate of gas supplied to the high-pressure section of the power plant in order to raise the rotation speed of the power plant's rotor.

The method under review does not make it possible to automatically control a power plant operating under conditions when there are independent programs according to which power is produced and gas is supplied at a predetermined pressure to the heat engines which power the gas compressors.

There is widely known a power plant of a compressor station of a gas main with gas pumping units including gas compressors and combustion chambers of gas turbine installations. The power plant under review comprises an electric generator having a power take-off chamber and intended to meet the power requirements of the compressor station, and an expansion engine whose shaft is coupled to that of said electric generator. The inlet of the expansion engine is connected through a heater and a control element, installed at the inlet of said expansion engine, to the gas main. The outlet of the expansion engine is connected to the combustion chambers of the gas turbine installations which power the gas compressors.

Similar power plants are provided with a line including a control member and bypassing the foregoing units.

However, the above power plant only meets the power requirements of the compressor station depending on the amount of gas supplied to the heat engines which power the gas compressors.

In case of a limitation in or a complete stop of the fuel gas supply due to an emergency situation at the compressor station, the foregoing power plant either limits or completely stops the production of electrical energy. In such situations, the use of other types of power producing equipment to meet the power requirements of the compressor station involves serious difficulties and considerably affects the operating reliability of the compressor station. For that reason, none of the existing autonomous compressor stations incorporates a power plant of the foregoing type despite its obvious thermodynamic effectiveness.

BRIEF DESCRIPTION OF THE INVENTION

It is an object of the present invention to provide a method which would make it possible to automatically control a power plant operating under conditions when electrical energy is produced independently of the supply of gas to the heat engines which power the gas compressors.

The foregoing object is attained by providing a method for automatic control of a power plant, according to which a control signal of the electric load of the electric generator is applied to a first control element to control the flow rate of gas supplied from the pipeline to the high-pressure section of an expansion engine, whereas a control signal of the pressure downstream of the expansion engine is applied to a second control element to control the flow rate of the part of the gas flow which is supplied through the low-pressure section of the expansion engine to a controlled counterpressure line, which method is characterized, according to the invention, by that the control signal of the electric load of the electric generator is applied to the first control element to control the flow rate of gas supplied from the gas pipeline to the high-pressure section of the expansion engine in order to control the amount of gas discharged from the take-off chamber of the expansion engine to the gas line, whereas the control signal of the pressure downstream of the expansion engine is additionally applied to a third control element to control the flow rate of the rest of the gas flow, which is installed in a line that bypasses the low-pressure section of the expansion engine in order to direct the rest of the gas flow to the controlled counter-pressure line.

The object of the present invention is further attained by providing a power plant of a compressor station of a gas pipeline system with gas mains and gas pumping units including gas compressors and combustion chambers of gas turbine installations, comprising an electric generator having a take-off chamber and intended to meet the power requirements of the compressor station, an expansion engine whose shaft is coupled to that of said electric generator and whose inlet is connected through a heater and a gas flow rate control element to the gas main, whereas its outlet is connected to the combustion chambers of the gas turbine installations, and a gas flow rate control element installed at the inlet of the expansion engine, as well as a second control element arranged at the inlet of the low-pressure section of said expansion engine, which power plant is characterized, according to the invention, by that it includes a third control element installed in a line which bypasses the low-pressure section of the expansion engine, a check valve installed at the outlet of the take-off chamber of the expansion engine, and a cooler of gas discharged from the take-off chamber of the expansion engine, which is arranged between the check valve and the gas line.

BRIEF DESCRIPTION OF THE ATTACHED DRAWING

Other objects and advantages of the present invention will be more readily understood from the following detailed description of a preferred embodiment thereof to be read in conjunction with the accompanying drawing which is a schematic diagram of a power plant, wherein the proposed method of controlling a power plant is realized.

DETAILED DESCRIPTION OF THE INVENTION

The proposed method for automatic control of a power plant is as follows. A control signal of the electric load of an electric generator 1 is applied to a first gas flow rate control element 2. Gas is supplied from a pipeline 3 to a high-pressure section 4 of an expansion engine 5. This makes it possible to control the amount of gas discharged from a take-off chamber 6 of the expansion engine 5 through a gas line 7 to a gas main 8. A control signal of the pressure downstream of the expansion engine 5 (in a controlled counterpressure gas line 9) is applied to a second control element 10 intended to control the flow rate of the first part of the gas flow. The first part of the gas flow is directed through a low-pressure section 11 of the expansion engine 5 to the controlled counterpressure line 9. Simultaneously, the control signal of the pressure downstream of the expansion engine 5 (in the controlled counterpressure gas line 9) is applied to a third control element 12 to control the flow rate of the rest of the gas. The control element 12 is installed in a line 13 which bypasses the expansion engine 5, whereby the rest of the gas flow is directed to the controlled counterpressure gas line 9.

The proposed power plant of a compressor station of a gas pipeline system with the gas mains 8 and gas pumping units 14 including gas compressors 15 and combustion chambers 16 of gas turbine installations 17 comprises the electric generator 1 whose shaft is coupled to that of the expansion engine 5. The expansion engine 5 has a high-pressure section 4, the take-off chamber 6 and the low-pressure section 11. The inlet of the high-pressure section 4 of the expansion engine 5 is the inlet of said expansion engine 5. It is connected to the gas line 8 through a heater 18 and the control element 2 intended to control the flow rate of gas supplied to the expansion engine 5. The control element 2 is hydraulically connected to an electric load transducer 19 of the electric generator 1. Due to said hydraulic connection, the control signal to control the rotation speed of the shaft (not shown) of the expansion engine 5 is applied to the control element 2 and the high-pressure section 4 of said expansion engine 5. The take-off chamber 6 of the expansion engine 5 is connected through a check valve 20 and a gas cooler 21 to the inlet of the compressor 15 mounted on the same shaft with the gas turbine installation 17. The outlet of the high-pressure section 4 of the expansion engine 5 is connected to the inlet of the low-pressure section 11 of said expansion engine 5 through the control element 10 to control the flow rate of the first part of the gas flow, supplied to the low-pressure section 11 of said expansion engine 5. The outlet of the low-pressure section 11 of the expansion engine 5 is the outlet of said expansion engine 5 and is connected through the controlled counterpressure gas line 9 to the combustion chamber 16 of the gas turbine installation 17. The controlled counterpressure gas line 9 is also connected through the gas line 13, which bypasses the low-pressure section 11 of the expansion engine 5, to the gas line 7. In the gas line 13, which bypasses the low-pressure section 11 of the expansion engine 5, there is installed the control element 12 which directs the rest of the gas flow to the controlled counterpressure gas line 9. The control elements 10 and 12, which control the flow rate of gas directed to the controlled counterpressure gas line 9, are hydraulically connected to a pick-up 22 of pressure in said gas line 9. Due to said hydraulic connection between the pick-up 22 and the control elements 10 and 12, the control signal of the pressure in the gas line 9 is applied to said control elements 10 and 12.

The operating principle of the proposed power plant of a compressor station of a gas pipeline system operating under variable conditions is as follows.

At a low flow rate of fuel gas and with a high electric load of the power consuming equipment, when the pressure of the fuel gas passing through the expansion engine 5 is insufficient to meet the power requirements, the control element 2 is opened by a control signal arriving from the electric load transducer 19 of the electric generator 1. As a result, a greater amount of fuel gas is supplied from the gas line 3 to the high-pressure section 4 of the expansion engine 5 than is necessary to burn in the combustion chambers 16 of the heat engines 17 which power the gas compressors 15. Downstream of the high-pressure section 4 of the expansion engine 5, the excessive amount of fuel gas is directed through the check valve 20 and the gas line 7 to the gas main 8. The necessary amount of gas is passed through the low-pressure section 11 of the expansion engine 5 to the controlled counter-pressure line 9 with the aid of the control element 10 by the control signal which arrives from the pick-up 22 depending on the pressure of gas in the line 9. The control signal of the pick-up 22 keeps the control element 12 open, which control element 12 is installed in the gas line 13 that bypasses the low-pressure section 11 of the expansion engine 5.

As the electric load of the power consuming units is reduced and as the fuel gas flow rate is increased so that the pressure of the fuel gas passed through the expansion engine 5 is greater than is necessary to meet the power requirements, there takes place the following sequence of events. The control element 2 is closed by the control signal arriving from the electric load transducer 19 of the electric generator 1. Upstream of the check valve 20, the pressure is reduced so that said check valve 20 is closed. As this takes place, the control element 10 is fully opened by the control signal of the pick-up 22 produced due to a reduced gas pressure in the controlled counterpressure gas line 9. The amount of fuel gas passed to the controlled counterpressure gas line 9 through the low-pressure section 11 of the expansion engine 5 is limited by the control element 2; as a result, the pressure in the controlled counterpressure gas line 9 goes down. The control signal of the pick-up 22 opens the control element 12 so that the necessary additional amount of fuel gas is supplied through the gas line 13, which bypasses the low-pressure section 11 of the expansion engine 5, to the controlled counterpressure gas line 9. Thus the proposed power plant proves to be highly reliable and versatile in producing a required amount of power and maintaining a predetermined flow rate of fuel gas, which substantially improves the operating conditions of the compressor station.

What is claimed is:

1. A method for automatic control of a power plant including an electric generator and an expansion engine having a high-pressure section, a take-off chamber and a low-pressure section and coupled to the electric generator's shaft, which method consists in that a control signal of the electric load of the electric generator is applied to a first control element which controls the flow rate of gas supplied from the gas line to the high-pressure section of the expansion engine, a control signal of the pressure downstream of the expansion engine is applied to a second control element which controls the flow rate of a part of the gas flow supplied through the low-pressure section of the expansion engine to a controlled counterpressure gas line;

the control signal of the pressure downstream of the expansion engine is applied to a third control element which controls the flow rate of the rest of the gas flow, which third control element is installed in a line that bypasses the low pressure section of the expansion engine, whereby the rest of the gas flow is directed to the controlled counterpressure gas line.

* * * * *